United States Patent Office 2,946,692
Patented July 26, 1960

2,946,692
PROCESS OF CURING MEAT AND COMPOSITION THEREFOR

Louis E. Kahn and Johannes A. Dalve, Cincinnati, Ohio, assignors, by mesne assignments, to E. I. du Pont de Nemours and Company, Wilmington, Del., a corporation of Delaware No Drawing. Filed Aug. 22, 1957, Ser. No. 679,769

10 Claims. (Cl. 99—222)

This invention relates to an improved, sweet-flavored, fryable meat product and to a method of preparing such a product. This is a continuation-in-part of our co-pending applications Serial Number 569,222, filed March 5, 1956, now abandoned, and Serial Number 583,373, filed May 8, 1956, now abandoned.

Meat products, such as bacon, normally contain sugar to give a sweet flavor thereto. Bacon, ham, and other pickle-preserved meats or meat products are processed to contain a substantial proportion of sodium chloride, or the like, and the sugar also serves to mask the flavor imparted by the sodium chloride. However, when sugar-containing meat is cooked, as by frying, grilling, or broiling, at least part of the sugar may caramelize or darken to give irregular darkened areas on the cooked meat. This is particularly the case with sugar-containing bacon, which commonly is cooked thoroughly. If the sugar-containing bacon is cooked sufficiently to fully render the fat of the bacon, a burnt taste may develop due to burning of the sugar. The amount of sugar which can satisfactorily be incorporated in bacon is limited, because, if more than approximately 1% by weight, of sugar is used, it is impossible satisfactorily to fry or grill the bacon product without undue darkening.

An object of this invention is to provide a sweet-flavored meat product such as bacon which retains its meat color on frying, grilling, or broiling, and does not darken excessively.

A further object of this invention is to provide a sweet-flavored bacon product which can be cooked until the fat thereof is fully rendered without developing a burnt flavor.

A further object of this invention is to provide an improved sweet-flavored bacon product which can be fried in a light colored skillet without leaving a dark residue in the skillet.

A further object of this invention is to provide a readily fryable bacon product or other meat product having a sweet flavor in which the sweetness level is substantially greater than that which can satisfactorily be obtained by the use of sugar.

A further object of this invention is to provide a sweet-flavored, pickle-preserved meat product in which the flavor of pickling agents, such as sodium chloride, and the like, is masked by a sweetening and masking agent which does not caramelize on frying of the meat product.

We have found that certain non-caramelizing, sweetening agents can be employed in bacon or other meat to provide a sweet-flavored product which browns evenly on frying or grilling and does not develop irregular dark or blackened areas. Preferably, we employ the sweetening agent sodium cyclamate (sodium cyclohexylsulfamate). The sodium cyclamate is dissolved in the pickling solution which is injected into bacon during curing thereof. The sodium cyclamate is substituted for the sugar normally used in the pickling solution, or for a portion of the sugar normally used, and, when the pickling solution is injected into the bacon, it produces a sweet flavor that is dispersed throughout the bacon. Other cyclamate sweetening agents may be used in place of sodium cyclamate. Soluble saccharin (the sodium salt) may be employed similarly, as may other saccharin compounds such as the calcium and magnesium salts or the acid itself.

The pickled bacon product and other meat products may be treated in the conventional manner following pickling and may be smoked and otherwise handled in the usual manner.

When one of the improved meat products is fried, grilled, or broiled, it browns evenly without developing the excessively dark or charred appearing areas, as do conventional, sugar-containing meat products.

Moreover, the improved meat products can be cooked to real crispness while the fat is being fully rendered without undue darkening. The pan in which the meat product is cooked is not blackened as is usual when conventional sugar-containing bacon and other sugar-containing meat products are fried, and the pan can readily be cleaned with soap and water alone without need for using a scouring agent.

Although sodium cyclamate is our prefererd sweetening agent, other non-caramelizing, sweetening agents can be used, such as calcium cyclamate, potassium cyclamate, ammonium cyclamate, magnesium cyclamate, iron cyclamate, cyclamic acid, amine salts of cyclamic acid, such as the triethanolamine salt and the mono- di- and triethyl and methylamine salts, saccharin, the sodium, calcium and magnesium salts of saccharin, sorbitol and dulcin (4 ethoxy phenyl urea). Other cyclamate sweetening agents can also be employed which are salts of cations which are non-toxic and are not readily hydrolyzed. It is preferred to use cyclamates having cations which are non-toxic and which occur in foodstuffs and form hydroxides having a pK value less than 10. Other saccharin sweetening agents can also be employed which are salts of cations which are non-toxic and which occur in foodstuffs and form hydroxides having a pK value less than 10. Other non-caramelizing sweetening agents which can be used include lower-alkyl glycine esters of cyclohexylsulfamic acid such as the glycine methyl and ethyl esters of cyclohexylsulfamic acid (which are disclosed in U.S. Patent No. 2,789,997), and N-(3-methyl-cyclopentyl)-sulfamic acid, and the sodium, calcium, and potassium N-(3-methylcyclopentyl)-sulfamates (disclosed in U.S. Patent No. 2,785,195).

The sweetening agent can be dissolved in the pickling solution which can be injected into the bacon in the usual fashion. The pickling solution can contain salts and water and can be similar in formula to conventional pickling solutions except that a non-caramelizing sweetening agent replaces all or a part of the sugar normally used.

The pickling solution normally contains sodium chloride and sodium nitrite and can, in addition, contan other salts and materials which are commonly employed in pickling solutions.

The sweetening agent, in dry form, can be combined with the nitrite and with other materials of the pickling solution, in dry form. In particular, the dry cyclamate sweetening agents can be mixed with dry nitrite in approximately the ratio desired in the pickled meat product to provide a dry mixture of nitrite and sweetening agent which can satisfactorily be transported and stored. In addition, if desired, the dry mixture can contain sodium chloride, but the proportion of sodium chloride in the dry mixture preferably is substantially less than that normally employed in the pickling solution. When the dry mixture of nitrite and sweetening agent is to be used, it can be dissolved in water along with sufficient sodium chloride, nitrite, and other additives, to make the desired pickling solution.

The following examples are given to illustrate the invention in greater detail, but it is to be understood that the examples are given primarily by way of example, rather than by way of limitation, except as set forth in the claims. In the following examples and in the remainder hereof, all parts and percentages are taken by weight.

*Example 1*

A pickling solution was prepared consisting of:

18.6% NaCl
0.23% calcium cyclamate
0.16% NaNO$_2$
Water to make up the remainder 10 parts of this pickling solution were injected into 100 parts of bacon in the form of a half side thereof. The half side was smoked in a conventional smokehouse having a temperature of about 140° F. and in a smoke filled atmosphere for eight hours. The bacon product had a sweetness level substantially equivalent to a content of 1% of cane sugar. Slices of this bacon product were fried in an aluminum frying pan until they were a golden brown color. Strips of commercial, sugar-containing bacon containing 1% of cane sugar were cooked in the same frying pan alongside the bacon of this example. When cooked, the sugar-containing strips of bacon had irregular darkened areas. When the sugar-containing bacon strips were removed from the frying pan, there were darkened patches on the pan where the commercial bacon had been fried, but only light brown areas where the bacon product of this example had been fried.

Similar results are obtained using a like amount of sodium cyclamate in the same way instead of the calcium cyclamate.

*Example 2*

A pickling solution was prepared consisting of:

18.6% NaCl
0.46% calcium cyclamate
0.16% NaNO$_2$
Water to make up the remainder 10 parts of this pickling solution were injected into 100 parts of bacon in the form of one-half side thereof. The half side was smoked in a conventional smokehouse having a temperature of about 140° F. and in a smoke filled atmosphere for eight hours to form a bacon product having a sweetness level equivalent to 2% by weight of cane sugar. Slices of this bacon product, when fried, were of an even, golden brown color. The fried bacon product had a pleasant taste substantially sweeter than that of commercial sugar-containing bacon. This bacon product was fried in an aluminum skillet alongside strips of commercial bacon containing 1% of cane sugar. The commercial sugar-containing bacon had irregular dark patches, and the frying pan was substantially darkened where the commercial sugar-containing bacon had been fried. Only a light brown color was produced in the grease in the pan where the bacon of this example had been fried. Similar results are obtained using a like amount of sodium cyclamate in the same way instead of the calcium cyclamate.

*Example 3*

A pickling solution was prepared consisting of:

18.6% NaCl
0.69% calcium cyclamate
0.16% NaNO$_2$
Water to make up the remainder 10 parts of this pickling solution were injected into 100 parts of bacon in the form of one-half side thereof. The half side was smoked in a conventional smokehouse having a temperature of about 140° F. and in a smoke filled atmosphere for eight hours. Strips of the bacon product were fried to crispness in an aluminum frying pan. The fried bacon had a golden brown color, the fat thereof having been substantially fully rendered. This bacon had a pleasant and a much sweeter flavor than that of commercial bacon.

Similar results are obtained using a like amount of sodium cyclamate in the same way instead of the calcium cyclamate.

*Example 4*

A pickling solution was prepared consisting of:

18.6% NaCl
0.023% soluble saccharin
0.16% NaNO$_2$
Water to make up the remainder 10 parts of this pickling solution were injected into 100 parts of bacon in the form of a half side thereof. The half side was smoked in a conventional smokehouse having a temperature of about 140° F. and in a smoke filled atmosphere for eight hours. Strips of the bacon product were fried to a uniform golden brown color in an aluminum frying pan. Strips of commercial bacon containing 1% of sugar were cooked in the same skillet alongside the strips of this example. The commercial bacon had irregular darkened areas. The saccharin-containing bacon product had a good flavor and a sweetness level substantially equal to that of the commercial sugar-containing bacon.

*Example 5*

A pickling solution was prepared consisting of:

18.6% sodium chloride
9.4% sorbitol
0.16% NaNO$_2$
Water to make up the remainder 10 parts of this pickling solution were injected into 100 parts of bacon in the form of a half side thereof. The half side was smoked in a conventional smokehouse having a temperature of about 140° F. and in a smoke filled atmosphere for eight hours. The bacon product had a sweetness level equal to bacon containing approximately one-half of 1% of cane sugar. Slices of this bacon were fried in an aluminum frying pan until the grease thereof had been fully rendered. The strips had a golden brown color and a pleasant flavor, and the sweetness thereof was somewhat less than that of commercial sugar-containing bacon containing about 1% of cane sugar.

*Example 6*

A pickling solution was prepared consisting of:

18.6% NaCl
18.8% Sorbitol
0.16% NaNO$_2$
Water to make up the remainder 10 parts of this pickling solution were injected into 100 parts of bacon in the form of one-half side thereof. The half side was smoked in a conventional smokehouse having a temperature of about 140° F. and in a smoke having a filled atmosphere for eight hours. The bacon product, when fried, had a sweetness level substantially equivalent to 1% of cane sugar. Slices of this bacon were fried to a golden brown color in an aluminum skillet. Substantially all the fat had been rendered therefrom. The fried bacon product had a pleasant flavor and a sweetness substantially equal to that of commercial bacon containing 1% of cane sugar.

In the dry mixtures of sweetening agent and nitrite, the ratio of sweetening agent to nitrite can be substantially the ratio desired in the finished product and can contain substantially the greatest ratio normally required in commercial practice. If the sweetening agent employed is calcium cyclamate such a mixture can contain approximately 2.9 parts of calcium cyclamate for each part of sodium nitrite, where a product is to be prepared having a sweetness equivalent to 2% by weight of cane sugar. For use in preparing a meat product having a sweetness equivalent to 1% of cane sugar, the dry mixture can contain approximately 1.4 parts of calcium cyclamate for each part of sodium nitrite, all parts being by weight. The proportion of cyclamate to sodium nitrite in compositions of this invention can range from about 10–90 parts of cyclamate to 90–10 parts of sodium nitrite, the parts in each instance adding up to 100 parts. In commercial practice, the upper limit or thereabouts on cyclamate content is preferred and the user can add nitrite as desired.

Where compositions are made using saccharin, then the ranges may be as follows: saccharin 1–50 and nitrite 99–50, the parts adding up to 100 parts. Mixtures containing both saccharin and cyclamate can be used, the proportions being such as to give a total sweetness equivalent to the amounts of sweeteners illustrated above. With mixtures of saccharin and cyclamate it is preferable to use about 1 part of saccharin for each 10 parts of cyclamate. If still additional sweetening agents are employed, they can be used in proportions to give a total sweetness equivalent to the amounts herein discussed.

*Example 7*

Anhydrous calcium cyclohexylsulfamate in the amount of 62.8 parts by weight is mixed with 37.2 parts by weight of sodium nitrite. This mixture, which can be sold as such, can be added by the user to water together with sodium chloride to give a sodium nitrite concentration of 0.16 percent and a sodium chloride concentration of about 18 percent by weight. This concentration is for a rate of injection into bacon of about one pound per ten pounds of bacon. The concentration of salt, sweetener, and nitrite can be varied with different injection rates and depending upon the specific character of bacon which is desired.

It is further to be noted that a small amount of sugar can be added. Further quantities of sodium nitrite can be added at the plant if this is desired and a small amount of other salts can be used in accordance with customary practices.

*Example 8*

Compositions are prepared as in Example 7 with the following proportions by weight:

|  | Composition a, parts by weight | Composition b, parts by weight |
| --- | --- | --- |
| anhydrous calcium cyclohexylsulfamate | 83.5 | 89.4 |
| sodium nitrite | 16.5 | 10.6 |

These mixtures can be used at the plant as shown in Example 7 for the curing of bacon by preparing the solutions having a sodium nitrite concentration as shown in Example 7.

*Example 9*

Instead of using calcium cyclamate, sodium cyclamate is used as follows:

|  | Composition a, parts by weight | Composition b, parts by weight | Composition c, parts by weight |
| --- | --- | --- | --- |
| sodium cyclamate | 63.1 | 83.7 | 89.5 |
| sodium nitrite | 36.9 | 16.3 | 10.5 |

Again, solutions can be made by the user to obtain the desired nitrite concentration or the solutions can be adjusted with respect to sweetness and nitrite concentration by the addition of nitrite and by the use of the desired amount of water. Sodium chloride can be added and the solution used as in Example 7.

*Example 10*

Mixtures of cyclamate and saccharin are formed as follows:

| | Parts by weight |
| --- | --- |
| Anhydrous calcium cyclamate | 45 |
| Saccharin | 4.5 |
| Sodium nitrite | 10 |

This mixture can be used as above described.

Compositions of the foregoing Examples 7, 8, 9, and 10 can be prepared by replacing any portion of the cyclamate shown with about one-tenth ($\frac{1}{10}$) as much by weight of saccharin as of the cyclamate replaced.

*Example 11*

A pickling solution was prepared consisting of:

6.95% NaCl
0.14% Sodium cyclamate
0.106% $NaNO_2$
4.0% Sodium tripolyphosphate
Water to make up the remainder 10 parts of this solution were injected into 100 parts of ham in the form of a commercial ham. The pickling solution was injected into the arterial system of the ham. The ham was then smoked in a commercial smokehouse for sixteen hours and until the internal temperature of the ham had reached a temperature of 140° F. The ham product, when cooked by grilling, had an excellent sweet flavor.

In the above examples equal amounts by weight of potassium cyclamate, magnesium cyclamate, and ammonium cyclamate can be used instead of the cyclamates there shown. Other appropriate cyclamate salts such as the amine salts like triethanolamine cyclamate, and the mono, di, and triethyl and methyl amine cyclamates can be used. Salts of saccharin such as sodium, calcium, and ammonium can be used. The calcium salts, however, are not used in compositions such as that of Example 11 because of the tendency to precipitation in the presence of sodium tripolyphosphate.

Potassium nitrite can be substituted in every instance for the corresponding sodium compound.

The dry composition may also be merchandised as substantially concentrated solutions in water using enough water to dissolve the components. In such solutions the pH should be adjusted to be about 7.

The cyclamate sweetening agents, saccharin, and dulcin can be conveniently employed in preparing bacon products having a greater sweetness than is possible with cane sugar. Such bacon products have a very desirable sweet flavor when sufficient of these sweetening agents is incorporated in the bacon product to give a sweetness equivalent to from 1% to 3% by weight of cane sugar. Bacon can be prepared containing greater amounts of sweetening agents, but, when more than sufficient to give a sweetness equivalent to about 5% sugar is employed, the bacon may have greater sweetness than is usually desired.

Sorbitol can be used to prepare a bacon product or other meat product of increased sweetness but is less convenient to use because of the lesser sweetness thereof.

If desired, smaller amounts of the sweetening agents may be incorporated in bacon; however, the sweetness of bacon containing a sweetness equivalent of less than about ¼% of sugar may not be as sweet as is usually desired.

If desired, two or more of the sweetening agents can be used in combination. Moreover, the sweetening agents can be used in combination with limited amounts of sugar, if desired, in order to provide some sugar taste and give a controlled amount of darkening. However, the amount of sugar should not be enough to lead to objectionable darkening of the product on cooking, and preferably is not more than about 0.3%. Sucrose (cane sugar) or dextrose can be used, or, if desired, other sugars can be used.

The pickling and sweetening materials can be incorporated in meats such as bacon, ham, and the like, most conveniently by injection of a solution into the meat. However, other common methods can be used for incorporating the pickling and sweetening materials in the meat. For example, meat can be placed in one of the pickling solutions and allowed to stand for a period of about twenty days to permit liquid diffusion through the meat. In another alternative process, a dry mixture of sodium chloride, nitrite and sweetening agent can be packed around the meat in a suitable container and the meat and pickling and sweetening materials can be permitted to stand for a sufficient time so that the juices of the meat dissolve the pickling and sweetening materials and the pickling and sweetening materials are absorbed in the meat.

The pickling and sweetening materials can be used in combination with other salts and other materials commonly employed in curing meats in accordance with usual procedures.

Although this invention has been described particularly with relation to preparation of a bacon product from bacon, other meats such as ham, Canadian bacon, cottage butts, shoulder cuts of pork, sausages, and the like, can be processed with similar materials and in a similar manner to provide sweet-flavored meat products which can be cooked by frying, broiling, grilling, or the like, without undue darkening.

The new bacon product and other meat products, on frying, grilling, broiling, or otherwise cooking at temperatures as high as those attained in frying meat products, produce less smoke than conventional sugar-containing meat products. When one of the meat products has been cooked in such a manner in a frying pan and removed therefrom, there is much less dark material left in the frying pan so that the frying pan can quickly and easily be cleaned. Moreover, it has been found that the bacon product and other meat products of this invention, when cooked alongside conventional sugar-containing bacon or other meats and meat products, by frying, grilling, broiling or the like, under identical conditions to substantial crispness, retain less grease than the conventional bacon, meats and meat products.

Having described our invention, what we claim as new and desire to secure by Letters Patent is:

1. In a method of preparing a pickle-preserved fryable meat product the step comprising introducing into a meat product a pickling solution consisting essentially of water, sodium chloride, and a sweetening agent selected from the group consisting of cyclamic acid, saccharin, cyclamates and saccharin salts of non-toxic foodstuff cations which form hydroxides having a pK value less than 10, sorbitol, dulcin, glycine methyl and ethyl esters of cyclohexylsulfamic acid, N-(3-methylcyclopentyl)-sulfamic acid, the sodium, calcium, and potassium N-(3-methylcyclopentyl)-sulfamates, and mixtures thereof.

2. In a method of preparing a bacon product, the step comprising introducing into bacon a pickling solution consisting essentially of water, sodium chloride, and a cyclamate of a non-toxic foodstuff cation which forms an hydroxide having a pK value less than 10.

3. In a method of preparing a bacon product, the step comprising introducing into bacon a pickling solution consisting essentially of water, sodium chloride, and sodium cyclamate.

4. In a method of preparing a bacon product, the step comprising introducing into bacon a pickling solution consisting essentially of water, sodium chloride and sorbitol.

5. In a method of preparing a bacon product, the step comprising introducing into bacon a pickling solution consisting essentially of water, sodium chloride, and a saccharin salt of a non-toxic foodstuff cation which forms an hydroxide having a pK value less than 10.

6. A process of curing meat products which comprises treating a fresh meat with a curing agent containing a non-toxic, water soluble salt of cyclohexyl sulfamic acid.

7. A composition for the pickle-preserving of fryable meat products consisting essentially of a mixture of an alkali metal nitrite and a sweetening agent selected from the group consisting of cyclamic acid, saccharin, cyclamates and saccharin salts of non-toxic foodstuff cations which form hydroxides having a pK value less than 10, sorbitol, dulcin, glycine methyl and ethyl esters of cyclohexysulfamic acid, N-(3-methylcyclopentyl)-sulfamic acid, the sodium, calcium, and potassium N-(3-methylcyclopentyl)-sulfamates, and mixtures thereof.

8. A composition for the pickle-preserving of fryable meat products consisting essentially of a mixture of 10 to 90 parts by weight of a cyclamate of non-toxic foodstuff cation which forms an hydroxide having a pK value less than 10, and 90 to 10 parts by weight of an alkali metal nitrite, the parts adding up to 100 parts.

9. A composition for the pickle-preserving of fryable meat products consisting essentially of a mixture of 10 to 90 parts by weight of sodium cyclamate and 90 to 10 parts by weight of an alkali metal nitrite, the parts adding up to 100 parts.

10. A composition for the pickle-preserving of fryable meat products consisting essentially of a mixture of 1 to 50 parts by weight of a saccharin salt of a non-toxic foodstuff cation which forms an hydroxide having a pK value of less than 10, and 99 to 50 parts by weight of an alkali metal nitrite, the parts adding up to 100 parts.

References Cited in the file of this patent

UNITED STATES PATENTS

| | | |
|---|---|---|
| 22,185 | Marsh | Nov. 30, 1858 |
| 2,084,864 | Paddock | June 22, 1937 |
| 2,311,235 | Kuderman | Feb. 16, 1943 |
| 2,528,204 | Zwosta | Oct. 31, 1950 |
| 2,688,556 | Komarik et al. | Sept. 7, 1954 |
| 2,761,783 | Ferguson | Sept. 4, 1956 |